Nov. 11, 1941.  D. P. HUNTER  2,262,102
LIQUID APPLYING UNIT
Filed Oct. 30, 1939  4 Sheets-Sheet 1

Inventor
Donald P. Hunter.
Attorney.

Nov. 11, 1941.   D. P. HUNTER   2,262,102
LIQUID APPLYING UNIT
Filed Oct. 30, 1939   4 Sheets-Sheet 2

Inventor
Donald P. Hunter
Attorney.

Nov. 11, 1941.         D. P. HUNTER              2,262,102
                    LIQUID APPLYING UNIT
                    Filed Oct. 30, 1939           4 Sheets-Sheet 3

Inventor
Donald P. Hunter.

Attorney.

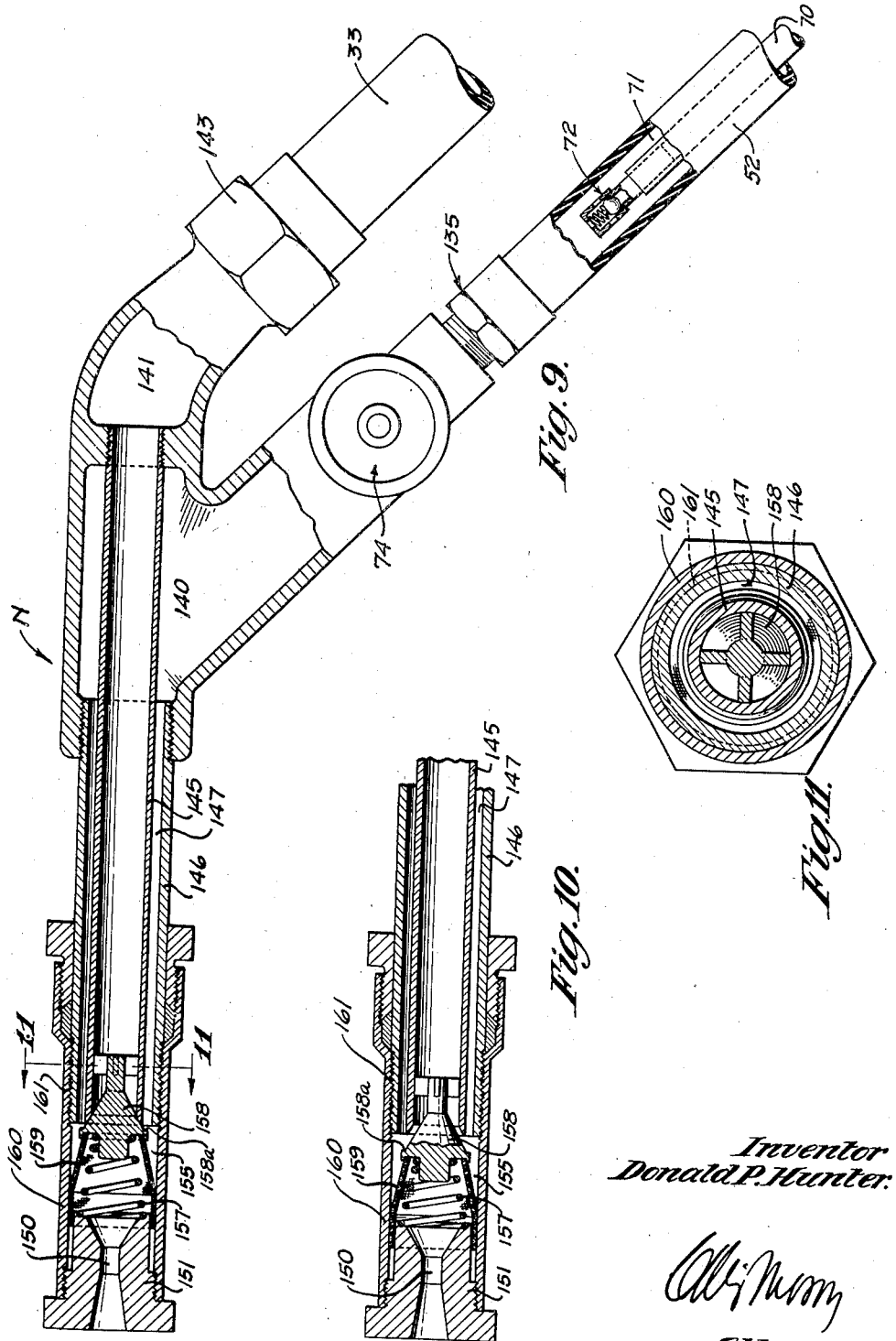

Patented Nov. 11, 1941

2,262,102

UNITED STATES PATENT OFFICE 2,262,102

LIQUID APPLYING UNIT

Donald P. Hunter, Los Angeles, Calif., assignor to Turco Products, Inc., Los Angeles, Calif., a corporation of California Application October 30, 1939, Serial No. 301,884

6 Claims. (Cl. 299—84)

My invention has to do with liquid application systems wherein liquids, such as chemicals in solution, are supplied under pressure and in proper quantities to a nozzle element from which they are sprayed.

For instance, one of the chief uses to which my invention is adaptable is as a washing unit for automobiles and the like wherein a solution of water, cleaning chemical and air is sprayed onto the surface being washed. One disadvantage of chemical application units of the prior art is that they are of a structure which does not positively prevent chemicals backing up into and contaminating the city water lines to which they are necessarily connected for water supply. Another shortcoming of prior art devices with which I am familiar resides in the fact that they are of a structure which, for any practicable capacity, requires a relatively large pressure tank within which the solution is contained and from which it is forced by air pressure through the nozzle. When such devices are sold in commerce, not only are the shipping costs relatively high but considerable difficulties are often experienced in complying with the varying regulations of different States concerning the varying specifications of pressure tanks of such sizes. Prior art devices also possess other shortcoming which have prevented them from going into general commercial use and it is among the objects of my invention to produce a unit or system which fully overcomes those shortcomings.

For instance, it is among my objects to provide a device which includes a positive shut-off of the main water line at a point substantially behind the point in the line at which chemical solution is present, which shut-off is under full and instant control of the operator at a point remote to the water shut-off valve structure.

Other important objects of my invention are the provision of a compact unit: which is easily movable from place to place; which has an open top chemical solution container for easy filling and checking of solution supply; in which it is possible to use an extremely small pressure tank for a device of relatively large capacity; wherein all control valves which are only occasionally manipulated are enclosed within the main casing; in which all parts are easily accessible for repair, adjustment or replacement; which is extremely light weight in comparison with other devices of like character and capacity; which is simple of operation and which is economical of manufacture.

While my invention has many other objects and corresponding attainments, those, together with the foregoing, will become obvious to those skilled in the art from the following detailed description of one preferred form which my invention may take, for the purposes of which description I refer to the accompanying drawings, in which:

Fig. 9 is a view, partly in longitudinal section, of the nozzle element;

Fig. 10 is a fragmentary section of Fig. 9, but showing the plunger valve in open position; and Fig. 11 is a cross-section on line 11—11 of Fig. 9.

Figure 1:
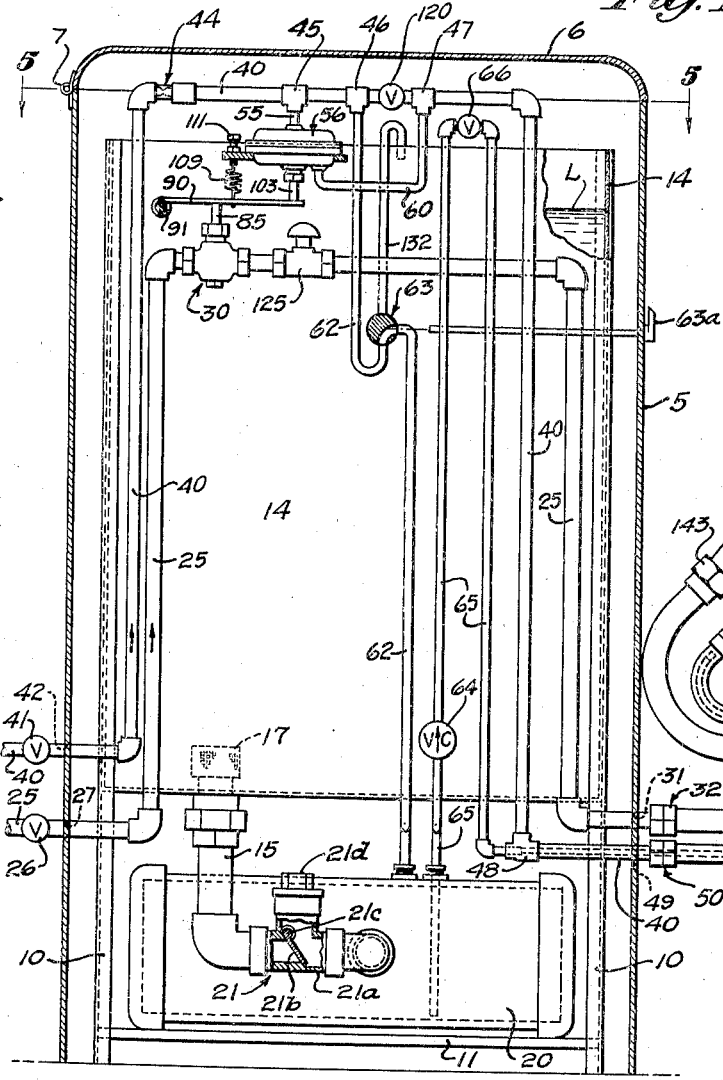
Fig. 1 is a vertical section, somewhat diagrammatic, with some parts shown in elevation.

My invention, in general, is comprised of the parts and novel arrangement and combination of parts as will hereinafter appear.

Referring to the drawings, the numeral 5 designates a casing having a top cover 6 hinged to the casing at 7. Within the casing, I provide a frame comprised of four angle iron corner posts 10 connected by four cross bars 11, which cross bars provide transverse bracing for the lower part of the frame. The upper part of the frame is braced by having secured thereto the four corners of a solution tank 14 from which leads a solution outlet pipe 15 communicating at one end with the interior of tank 14 through a screen 17 and communicating at its other end with a solution dispensing tank 20 adapted to be large enough to hold a charge of solution ample for one washing operation and designed to be maintained under pressure. Between the inlet and outlet ends of pipe 15, I interpose a check valve 21 which is comprised of a casing 21a, a flap member 21b hinged thereto at 21c and an access plug 21d. The solution in tank 14 passes to tank 20 by gravity flow when pressure within tank 20 is relieved as will be hereinafter described.

A water supply line 25, controlled exteriorly of the casing by a shut-off valve 26, leads through an opening 27 in the casing 5, through the control valve 30 and thence outwardly, through an opening 31 in the casing, to the adapter 32 by which it is connected to a flexible hose 33 leading to a spray nozzle member N. Nozzle N may be of any suitable type adipted to receive and admix a plurality of streams of liquid and then spray the admixture. For instance, I show a nozzle particularly adaptable for this purpose in my copending application Serial Number 301,785, filed October 28, 1939, entitled Nozzles.

An air supply pipe 40, controlled exteriorly of the casing by a shut-off valve 41, enters the casing through an opening 42, passes through a restriction 44, through T's 45, 46, 47, 48, respectively, and through an opening 49 in the casing to an adapter 50 by virture of which a flexible hose 52 is connected thereto. Hose 52 leads to the nozzle N. From T 45, a pipe 55 leads to one side of a diaphragm control unit 56, to be described. A pipe 60 leads from T 47 to the other side of the diaphragm 57 for the purpose to be later described. From T 46 an air delivery pipe 62 leads, through a conventional two-way valve shown diagrammatically at 63, to the pressure tank 20 above the liquid level therein. Valve 63 is operated from the exterior of casing 5 by means of rod 63a.

From below the liquid level in tank 20 a chemical solution delivery pipe 65 leads through a check valve 64 (seating in a direction towards the tank 20), through a manual control valve 66 to T 48. Within the T 48 a nipple 67 is mounted in the end of line 65 to provide a connection for a flexible hose 70 leading to the nozzle N longitudinally through the air hose 52. Hose 70 is of a smaller external diameter than the interior diameter of pipe 40 and hose 52 to provide a passageway 71 within pipe 40 and hose 52 around hose 70. The air and solution entering nozzle N through lines 52, 70 may be cut off within the nozzle inlet by a manually actuated control valve of conventional structure, shown diagrammatically at 74.

In the operation of such devices, it often becomes desirable to shut off the spray at the nozzle and in this connection it is highly desirable that the water supply from the water mains be instantly shut off at a point substantially behind the nozzle to prevent any back pressures in the nozzle and hose line from forcing any chemical solution in the nozzle back into the main water supply. In my invention, I provide means for effectively accomplishing this end, which will now be described.

Figure 2:
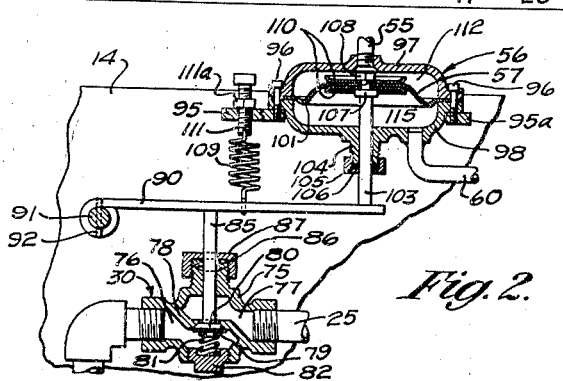
Fig. 2 is an enlarged fragmentary section of one of the control valves and its actuating mechanism.
Figure 5:
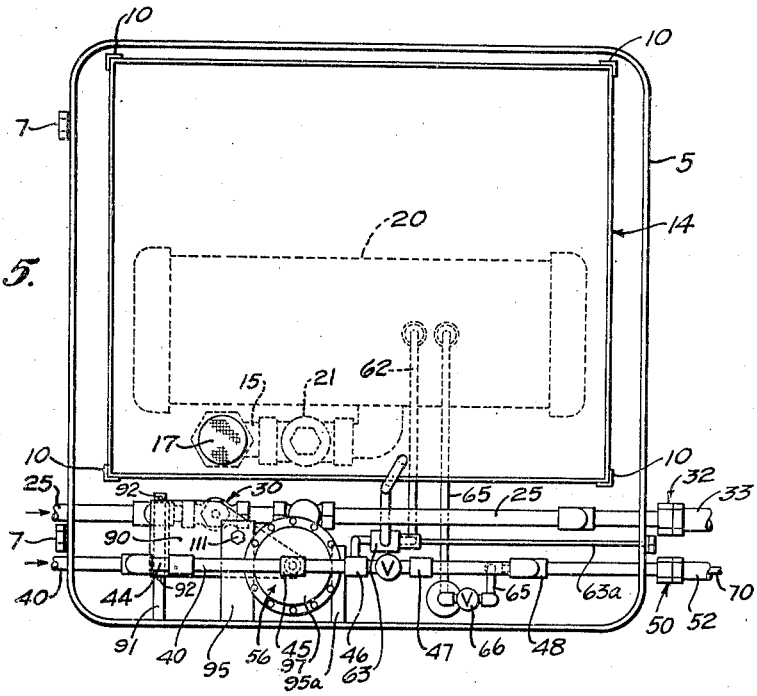
Fig. 5 is a plan section taken on line 5—5 of Fig. 1.

As best shown in Fig. 2, I show, in the water line, within casing 5, a valve 30 comprised of a T-shaped casing 75 having an inlet chamber 76 and an outlet chamber 77 separated by wall 78 having an opening therethrough forming a seat 79 for a valve 80. Valve 80 is normally urged into seating position by coil spring 81 seating at one end against valve 80 and at its other end within a recess provided in the plug 82. Valve 80 has secured thereto and extending upwardly from its opposite side an operating stem 85. Said stem passes through openings in the packing 86 and packing nut 87 carried by the casing 75, and its top end contacts the underside of a lever 90 which is pivotally mounted on a stud 91 projecting from casing 5, pins 92 in stud 91 preventing axial displacement of the lever. Diaphragm unit 56 is carried by brackets 95 and 95a projecting from casing 5, and is comprised of an upper section 97 and a lower section 98 secured together by screws 96. Between said sections the peripheral edge of a flexible diaphragm 57 is confined, said diaphragm having an annular corrugation 101 between its peripheral edge and its center for added flexibility. A valve actuating plunger 103 projects through lower casing section 98 by passing through boss 104, packing 105 and packing nut 106, the lower end of the plunger resting upon the free end of lever 90. The upper end of the plunger is secured in a central opening in diaphragm 57, the diaphragm being confined between the annular flange portion 107 of the plunger, the nut 108, and opposite cup washers 110. Plunger 103 is normally urged into its uppermost position by spring 81, lever 90 and by a coil spring 109, which latter spring is anchored at its lower end to lever 90 and at its upper end to a screw 111 which is mounted in bracket 95 and carries an adjustment nut 111a. Thus the tension on the spring 109 may be adjusted by the nut 111a and the tension on spring 81, within the valve casing, may be adjusted by means of the threaded plug 82. Spring 81 normally urges valve 80 toward seating position. The combined effective force of springs 81 and 109 is sufficient to slightly overbalance the force of the air pressure acting upon the upper end of the plunger 103 when the pressures in chambers 112 and 115 are equalized.

When valve 63 is in the position shown in Fig. 1, the solution in tank 20, pipe 65 and hose 70 is subjected to air pressure leading from pipe 40 to tank 20 via pipe 62, the flap 21b of valve 21 being automatically seated to prevent the solution within the tank 20 from being forced back into the main tank 14 through line 15 by pressure in tank 20. One of the advantages of my invention resides in the structure which renders it possible to use such a relatively small pressure tank, designed to be only large enough to hold a charge of chemical solution sufficient for one cleaning operation. This feature is particularly advantageous inasmuch as it materially reduces the weight of the unit and makes it much easier to comply with various State regulations as to pressure tank specifications. Pressure tanks must be of sufficiently strong and heavy material as to withstand large pressures, whereas my solution supply tank 14, which contains the main solution supply, may be of relatively light material since it does not have to withstand pressures. After a charge of solution in pressure tank 20 is dispensed through the nozzle, I provide simple means for refilling the tank, and that means will now be described. First, of course, in order to enable the solution to pass from the main supply tank 14 (which is open to atmosphere) to the pressure tank 20 by gravity flow, the pressure within the tank 20 must be relieved and this is accomplished by means of the two-way valve 63 (Fig. 1). This valve is shown in Fig. 1 in position establishing communication between the main air line and tank 20. When it is turned to the position shown in Fig. 4, the air line to the tank 20 is closed off and pipe 62 below valve 63 is placed in communication with bleed pipe 132 so that the two pipes become a vent pipe to relieve the pressure within tank 20. As the tank 20 then fills by gravity flow from main tank 14, the liquid level in the pipe lines 62, 132 will rise to the liquid level L in tank 14. Thus when valve 63 is again moved to the position of Fig. 1 to place the main air line 40 in communication with the tank 20, a small amount of solution will be trapped in pipe 132 above valve 63, which trapped fluid will be blown out during the next operation of bleeding the tank 20. Therefore, so that the trapped fluid will be returned into tank 14, I show the top end of pipe 132 as being U-shaped so that its discharge end is directed into tank 14.

The concentric air and solution lines 52, 70, respectively, communicate with the spray nozzle N through the coupling 135, control valve 74 and the nozzle inlet chamber 140. Solution line 70 terminates a short distance ahead of valve 74 (see Fig. 9), and is provided with a spring-pressed check valve 72, the purpose of which will be described later. The water hose 33 communicates with nozzle inlet chamber 141 through the coupling 143. The nozzle device N which I have here shown, comprises a water delivery tube 145 mounted concentrically within an air-solution delivery tube 146, tube 145 being of smaller exterior diameter than is the interior diameter of tube 146 to provide a passageway 147 therearound. The nozzle has a Venturi-shaped discharge outlet 150 through a tip plug 151 carried by tube 160, which latter is threaded on tube 146 at 161 and between plug 151 and the discharge ends of the passageways through tubes 145, 146, I provide a mixing chamber 155 within which the several streams of fluid are thoroughly admixed. Within the chamber 155 and with its apex end towards the outlet ends of tubes 145, 146, I provide a cone-shape atomizing screen 159. A cone-shaped plunger 158 is mounted in the end of tube 145 with its apex end within the outlet end of the tube, said plunger being adapted to seat against the end of tube 145 when it is not held off its seat by pressure within the tube 145. Plunger 158 is provided with an annular lip 158a which projects into the path of the air and solution stream at the discharge end of passage 147, so that the force of the air and solution stream impinging upon said lip will tend to move plunger 158 in an opening direction against the action of spring 157, which is positioned between plug 151 and plunger 158. For a given water pressure within tube 145, the flow of water past plunger 158 will be governed by the strength of spring 157 and the force of the air and solution stream impinging against lip 158a. Thus the flow of water will vary substantially in accordance with the flow of air and solution and thereby maintain a substantially uniform mixture. The tension of spring 157 may be adjusted by virtue of the threaded connection 161 of tube 160 with tube 146. When the fluid pressures are released, spring 157 automatically seats plunger 158. As the water stream emerges from tube 145 into chamber 155 it is somewhat atomized and directed outwardly by the conical face of the plunger 158 and by lip 158a so that the water stream intersects the air and chemical solution steam entering the chamber through passage 147 and the mixture is further atomized by being forced through screen 159 and through the Venturi outlet 150.

When nozzle valve 74 is open, with the air stream passing normally through the air line 40, the water line valve 80 is held open against the pressure of springs 81 and 109 by the air pressure within chamber 112, which pressure forces the diaphragm center downwardly, the air pressure within chamber 112 being relatively greater than the pressure within chamber 115 due to the opening through valve 120 being restricted. Restriction 44 is interposed in the air line ahead of the diaphragm element so as to restrict the air pressure to the efficient capacity of the compressed air supply. To close off the air, solution and water lines the operator manually turns the valve 74 at the nozzle, which valve acts directly to close the air-solution flow into chamber 140 of the nozzle. The closing of valve 74, shutting off as it does the flow of air at the nozzle, causes an instantaneous equalization of pressure on the diaphragm within the chambers 112 and 115 through pipes 55, 60, permitting the water valve 80 to be seated by pressure of the spring 81. Valve 80 will remain thus closed until nozzle valve 74 is again opened, at which time the restricted valve 120 in the air line between pipes 55 and 60 causes a pressure differential in the chambers 112, 115 sufficient to depress lever 90 against the pressure of springs 81 and 109, and open valve 80. This remote control of the water line valve enables the closing of the water line at a point remote from the nozzle, which insures against any solution within the nozzle backing up into the water line. It sometimes happens that the main water supply before it communicates with the unit is taxed by other uses, such for instance as water supply for fire-fighting apparatus, sufficiently to induce a vacuum in line 25. To safeguard against such a vacuum pulling chemical solution from the nozzle into the water mains, I interpose in the water line 25 a vacuum breaker 125 of well known construction.

The operation of the device of Figs. 1 to 5, inclusive, is as follows: With the pressure tank 20 having been filled with solution from tank 14 and valve 63 being in the position shown in Fig. 1, to communicate air pressure to the tank 20, with the water line valves 26, 80 and air line valve 41 and chemical solution line valve 66 and nozzle valve 74 all open, water, air and chemical solution are being fed under pressure through lines 33, 52, 70 to the nozzle, in whose mixture chamber 155 they are intimately admixed before being discharged therefrom as a spray. The discharge of chemical solution from hose 70, past check valve 72, into hose 52 (ahead of valve 74) takes place because of a pressure differential that exists at this point and causes check valve 72 to be moved from its seat against the action of its spring. This pressure differential is due partly to that induced by restriction 120 (pipe 62 being connected to pipe 40 ahead of restriction 120) and due partly to the lowered pressure of the air at the nozzle since it discharges to atmosphere. Valves 26, 41 and 66 are manually controllable so that the operator may adjust the device to deliver any desired proportions to the nozzle. As hereinabove stated, when it is desired to stop the spray the operator may do so at the nozzle regardless of its distance from the casing 5, which contains the other elements of the device, by closing valve 74, which in turn equalizes the pressure on the water valve actuating diaphragm to permit that water valve to be closed by spring pressure. When valve 74 is closed, the air pressure on hose 52 becomes equalized with the pressure of the chemical solution in hose 70, thereby permitting check valve 72 to be seated by its spring.

Figure 4:
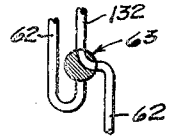
Fig. 4 is a fragmentary section of the two-way valve.
Figure 3:
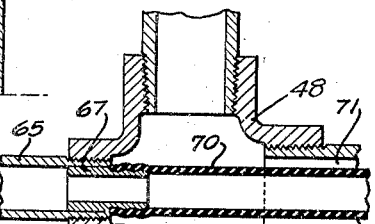
Fig. 3 is an enlarged fragmentary view in section of one of the coupling members.

After a spraying operation has been completed and tank 20 exhausted of its charge, tank 20 is then relieved of its pressure by moving valve 63 from the position of Fig. 1 to the position of Fig. 4, which exhausts the air in chamber 20 as well as any trapped solution in pipe 132, through the outlet end of pipe 132. With the pressure thus relieved in tank 20, the tank automatically refills by gravity flow through line 15 from the main supply tank 14. After tank 20 has thus been refilled, valve 63 is turned back to the position of Fig. 1 to recommunicate pressure to tank 20, which pressure automatically closes flap valve 21b in pipe line 15. When valve 63 is in the position of Fig. 4 and at least during the time tank 20 is being filled by gravity flow from tank 14, valve 74 may be opened to deliver air and water for rinsing purposes, the water valve being opened coincident with the opening of valve 74 as explained above. Check valves 64 and 72 prevent the compressed air from forcing the solution in hose 70 and pipe 65 back into tank 20. Hose 70 is prevented from collapsing by the fluid trapped between check valves 64 and 72.

Figure 7:
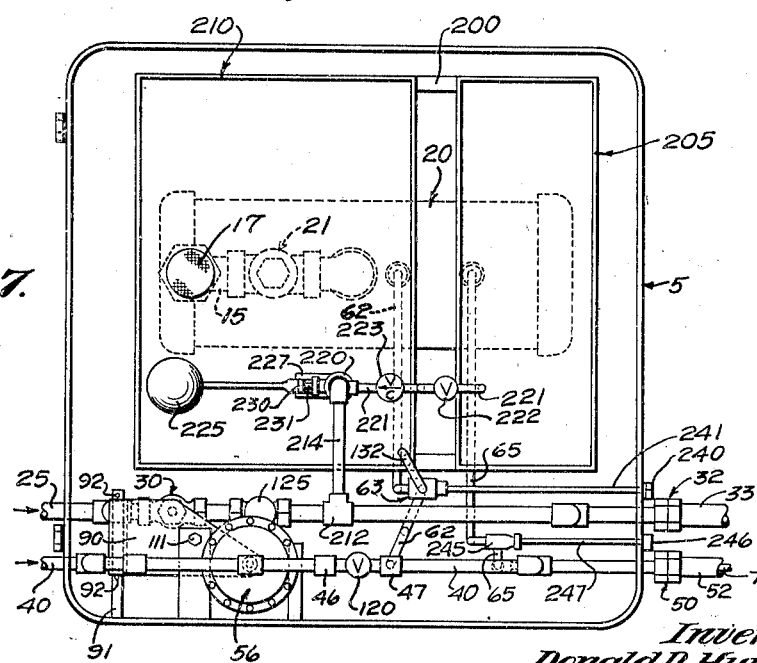
Fig. 7 is a plan section on line 7—7 of Fig. 6.
Figure 6:
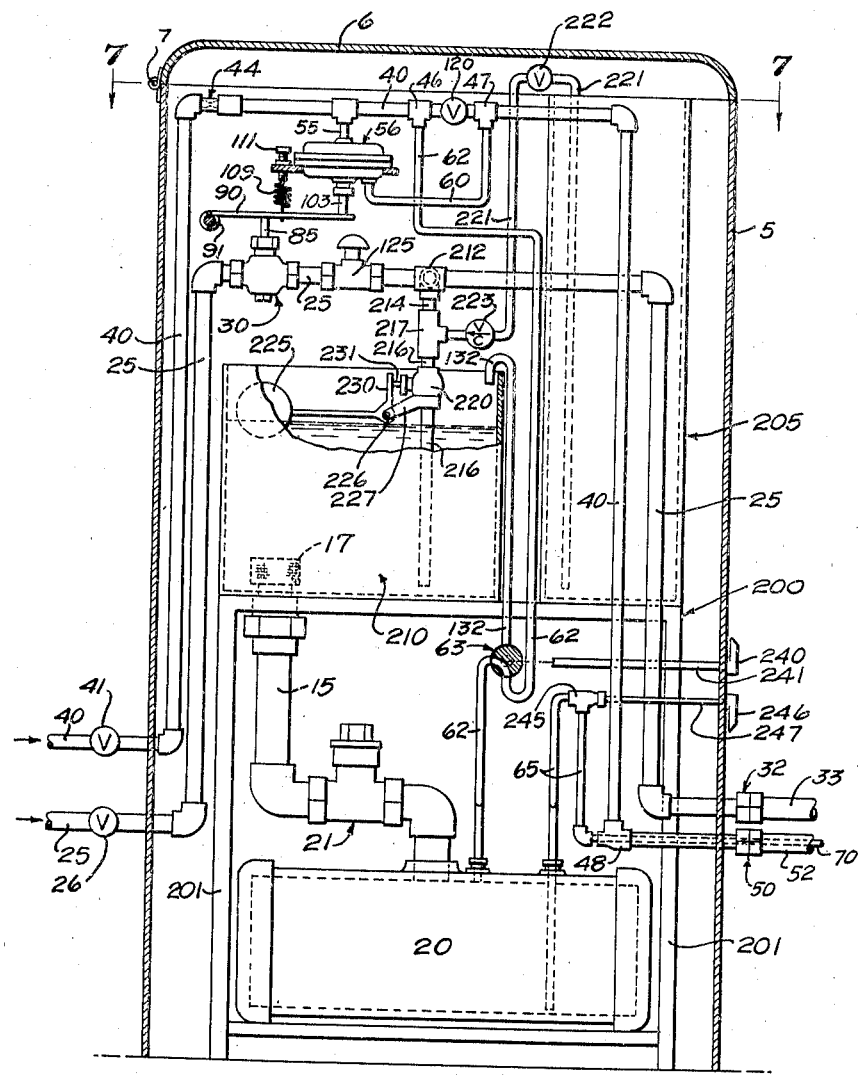
Fig. 6 is a vertical section, partly in elevation, showing a variational form of my invention.
Figure 8:
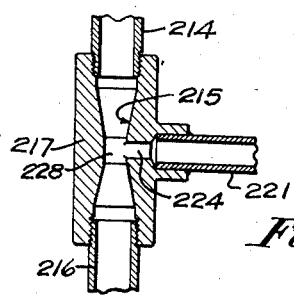
Fig. 8 is an enlarged fragmentary section of a Venturi member.

In Figs. 6 and 7, I show a variational form of my invention wherein the parts are as before described and will be given like reference numerals, except insofar as I shall now describe.

In this variational form, I show, in lieu of the frame 10, a table 200 having corner supporting legs 201, and upon this table I mount a tank 205 adapted to contain a chemical in concentrated liquid form, and a solution tank 210 from which a pipe 15 leads to the pressure tank 20 in the manner described hereinbefore.

In the main water line 25, I insert a T fitting 212 between the vacuum breaker 125 and the outlet to the nozzle, from which T a pipe 214 leads to another T member 217 which has therethrough a Venturi-shaped passageway 215. A pipe 216, controlled by plunger valve 220, leads from the lower end of the T 217 to discharge into tank 210. A concentrate delivery line 221 leads from the tank 205 through a manual control valve 222 and through a check valve 223, which check valve seats towards the tank 205, into a restricted opening 224 in fitting 217. This opening 224 communicates with the restricted opening 228 in fitting 212. A float member 225 is pivotally connected at 226 to a bracket 227 mounted on pipe 216 and has an upwardly projecting arm 230 adapted to bear against plunger 231, which plunger actuates valve member 220 to close said valve when the liquid level in tank 210 rises to the point shown in Fig. 6.

In this form of device the exhaust line 132 leads into solution tank 210 from the two-way valve 63, which latter valve operates in the same manner and for the same purposes as before described, there being a manual control handle 240 mounted exterior of casing 5 on the valve operating shaft 241, the inner end of which shaft is operatively connected to valve 63 in any of the well known manners. The solution delivery line 65 is manually controlled by valve 245, which valve is actuated by means of a control handle 246 disposed outside casing 5 by being secured to the outer end of the valve operating shaft 247, said shaft being operatively connected at its inner end to valve 245.

The differences in operation of this variational form of my invention as compared with Figs. 1 to 5, inclusive, are as follows: As the liquid level in the solution tank 210 becomes sufficiently low, the float 225 is thus lowered to permit valve pin 231 (which pin is normally urged outwardly into valve opening position by a coil spring within the valve member 220, said spring not being shown) to move outwardly and open valve 220. This places the water line 25 in communication with the solution tank 210, delivering water to the tank 210 until the fluid level raises the float to close valve 220 (position of Fig. 6). The water stream passing through the Venturi-shaped opening 228 in fitting 217 as tank 210 is being filled, induces a vacuum at the venturi which draws a proper amount of concentrate (which amount is controllable by adjustment of valve 222) from the tank 205 through line 221, which concentrate is admixed with the water stream passing through the venturi 228. In that manner tank 210 is refilled with a solution of cleaning chemical and water, which solution is in turn supplied from tank 210 to pressure tank 20 in the manner before described. The check valve 223 prevents backing up of water from fitting 212 into the concentrate tank 205 after valve 220 has been closed.

While, in the foregoing description, I have resorted to various details of structure and association of parts, I wish it understood that I do not thereby confine my invention to such specific details. Rather, various modifications and adaptations may be made within the broader scope of the invention as defined by the appended claims.

I claim:

1. In a device of the class described, a fluid discharge member, a line for transmitting fluid under pressure from a source to said discharge member, a second fluid transmitting line for transmitting a fluid from a source to said discharge member, a valve in the second line functioning to open and close communication therethrough, said valve being positioned in the said fluid line towards the source and at a point remote from the discharge member, pressure applying means for actuating said valve in performing one of said functions, fluid pressure operated means for operating said valve in performing the other of said functions, said last mentioned means being actuated by the fluid pressure in the first mentioned fluid transmitting line, and valve means positioned remote from said valve for controlling the fluid pressure in the first mentioned line whereby to cause it to operate the said fluid pressure operated means.

2. In a device of the class described, a fluid discharge member, a line for transmitting fluid under pressure from a source to said discharge member, a second fluid transmitting line for transmitting a fluid from a source to said discharge member, a valve in the second line for opening and closing communication therethrough, pressure applying means for operating said valve in closing position, means for moving said valve into and maintaining it in open position against the action of said first mentioned pressure applying means, including: a diaphragm, a diaphragm casing, said diaphragm being mounted in and dividing the casing into two pressure chambers to which respective chambers the respective opposite faces of the diaphragm are exposed, a tube communicating pressure from the first mentioned fluid line to one of said chambers, a second tube spaced along said first mentioned fluid line from the first mentioned tube and communicating pressure from said first mentioned line to the other of said chambers, means forming a restriction in said first mentioned line between said tubes whereby to cause greater pressure to be transmitted to one of said chambers than to the other when the outlet end of said first mentioned line is open, and means for opening and closing the outlet end of said first mentioned line.

3. A device of the class described comprising, in combination with sources adapted to deliver fluid under pressure, a nozzle, fluid delivery lines leading to the nozzle, the first of said lines leading from one of said sources and the second of said lines having a restriction therein and leading from another of said sources, a control valve in the first of said lines at a point remote from the nozzle, spring means urging the valve into closing position, a casing divided into opposite pressure chambers by a flexible diaphragm mounted therein, means establishing communication between the second line and one of the chambers at a point between said source and said restriction, means establishing communication between the other of said chambers and said second line at a point between the restriction and the nozzle, means operatively connected at one end to the diaphragm and at its other end to the valve for opening the valve against said spring pressure by virtue of movement of the diaphragm, and manual control means at the nozzle for controlling communication of pressure from the second line to said respective chambers whereby to cause movement of the diaphragm.

4. In a device of the class described, a discharge nozzle, a pair of lines for transmitting fluid under pressure from respective sources to said nozzle, a valve in the first of said lines functioning to open and close communication therethrough, means for actuating said valve to perform one of said functions, fluid pressure operated means communicating with the second of said lines and operably connected to said valve to actuate the same to perform the other of said functions, said fluid pressure operated means including a casing, a diaphragm separating the casing into two opposite chambers, a restriction in the second line, means establishing communication between one of the chambers and the second line at a point between the restriction and said source and means establishing communication of the other of said chambers with the second line at a point between the restriction and the nozzle.

5. A device of the class described including a fluid discharge member, a main fluid delivery line leading from a source capable of delivering fluid under pressure and having its discharge end communicating with the discharge member, a storage tank open to atmosphere, a pressure tank below the storage tank, a passage establishing communication between said tanks, a check valve in said passage and seating towards the storage tank, a fluid delivery line leading from the fluid pressure tank to the discharge member, a branch line leading from the main fluid delivery line to the pressure tank to maintain pressure therein, a bleed line leading from said branch line to atmosphere, and a valve in the branch line at the intersection therewith of the bleed line, said valve being independent of the main fluid line and operable to close communication from the main fluid line to the pressure tank and bleed the latter to atmosphere while permitting the main fluid delivery line to the discharge member to remain open.

6. A device of the class described comprising, in combination with sources adapted to deliver fluids under pressure, a discharge member, valve means for opening and closing the discharge member, first and second fluid delivery lines leading from said respective sources to the discharge member, the first of said lines having a restriction between its ends whereby to cause a pressure differential in said line between the respective sides of the restriction when the discharge member is open, a control valve in the second of said lines at a point remote from the discharge member, spring means operating said valve in one direction, diaphragm means operatively connected with said control valve, and means establishing communication between the respective sides of said diaphragm and the first fluid delivery line at the respective sides of said restriction, said diaphragm means being operable by said pressure differential in the first of said lines to move said control valve in the other direction against said spring.

DONALD P. HUNTER.